March 11, 1952 B. VER NOOY 2,589,170
PIPE-LINE SCRAPER TRAP ASSEMBLY
Filed Dec. 2, 1948 2 SHEETS—SHEET 1

Burton Ver Nooy Inventor
By W.D.Kilmar Attorney

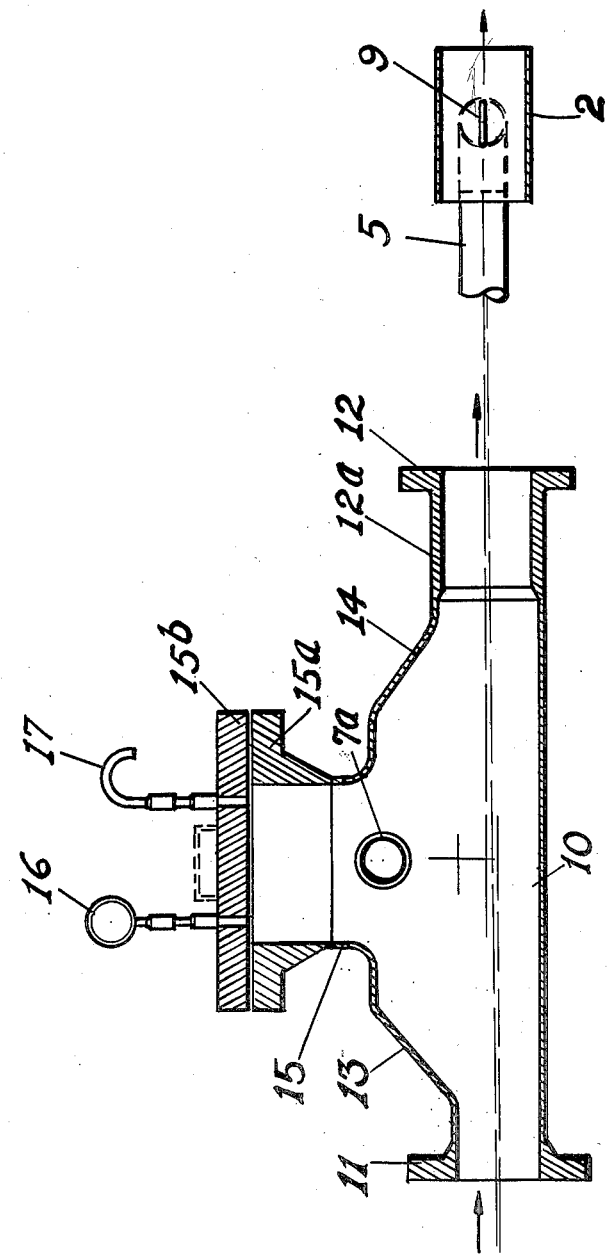

Patented Mar. 11, 1952

2,589,170

UNITED STATES PATENT OFFICE 2,589,170

PIPE-LINE SCRAPER TRAP ASSEMBLY

Burton Ver Nooy, Atlanta, Ga., assignor to Standard Oil Development Company, a corporation of Delaware Application December 2, 1948, Serial No. 63,013

1 Claim. (Cl. 15—104.06)

The present invention relates to a means for introducing a pipe-line scraper into a conduit or pipe line and for intercepting and removing such scraper element at a point in the line removed from the point of introduction. More particularly the invention relates to an assembly forming an integral part of a conduit system, including a trap through which a pipe-line scraper element may be introduced or removed, an auxiliary pipe-line section by-passing the trap and valve means in the main auxiliary lines for suitable operation of the assembly.

It is an object of the invention to provide a trap assembly by means of which a pipe-line scraper element may be introduced and removed from the conduit system without substantially impeding the flow of a fluid material therethrough and without excessive spillage of such fluids from the trap. It is also an object of the invention to provide such an assembly in which the scraper element is not liable to become wedged in the trap or related operating parts and in which pressure drop in the line during introduction or removal of the scraper element is substantially minimized.

The invention and its objects may be fully understood from the disclosure of the following specification when read in conjunction with the accompanying drawings, in which:

Fig. 2 is a vertical section through the trap along the line II—II of Fig. 1; and Fig. 3 is a similar view through the pipe line at a bypass junction point as along line III—III of Fig. 1.

Figure 1:
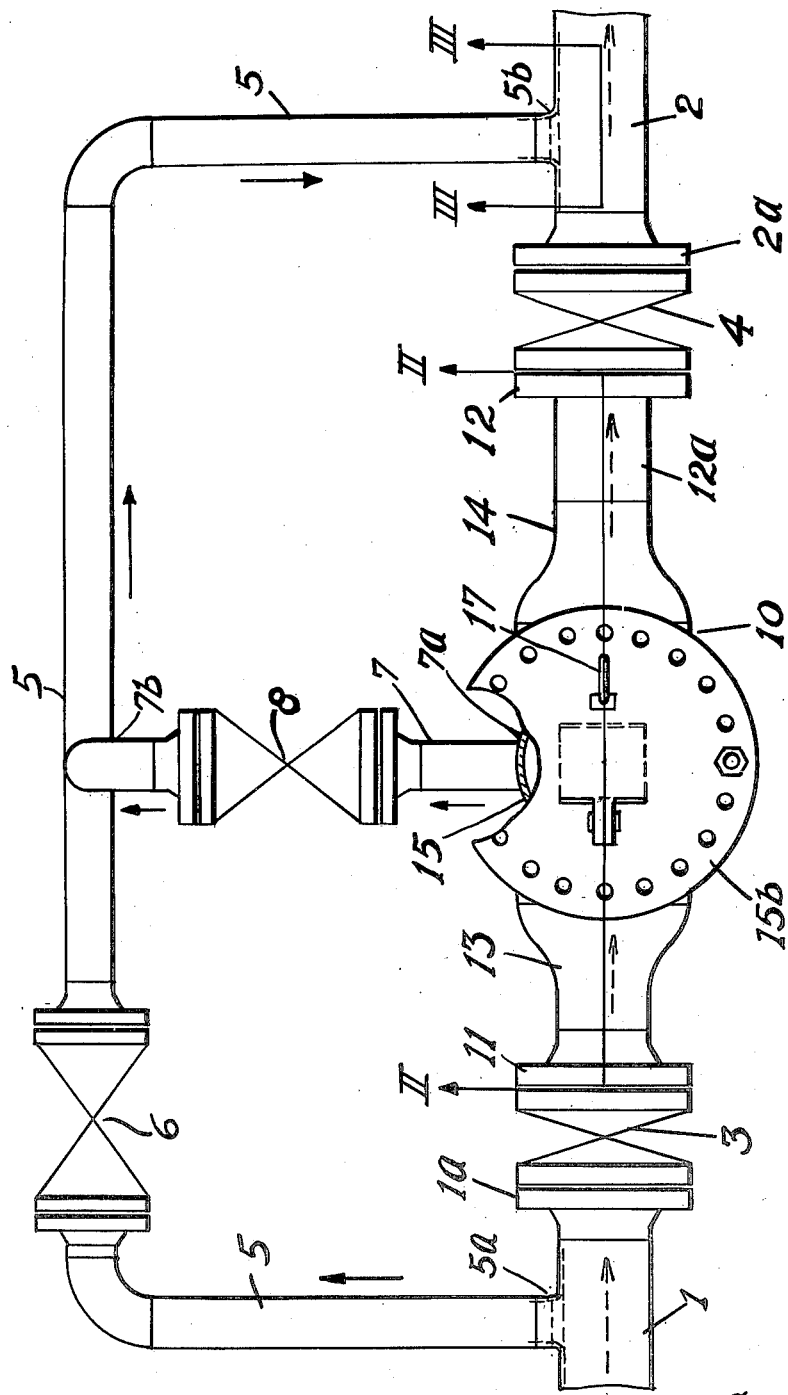
Fig. 1 is a plan view of the assembly and related portions of the pipe line with parts broken away.

In the embodiment of the invention as illustrated by the drawings the numerals 1 and 2 indicate the spaced opposed ends of two sections of a pipe line or conduit system, flow through the system being in the direction indicated by arrows. The section ends are provided with flanged portions 1a and 2a respectively. Secured to the flange portions 1a and 2a respectively are valves 3 and 4. These valves may be gate valves or plug valves which, when fully opened, provide a circular passage through the valve of a diameter substantially equal to the inside diameter of the conduit portions 1 and 2. Between the opposed ends of the valves 3 and 4 is disposed a pipe-line scraper element trap 10 secured to valves 3 and 4 respectively by means of flange portions 11 and 12.

As illustrated in Figs. 1 and 2 the trap 10 is an enlarged conduit section composed of an annular flange portion 11 joined to an enlarger element 13 by means of which the inside diameter of the line is increased to approximately twice its diameter and a flange portion 12 joined to a similar element 14 by means of which the increased diameter is again reduced. As shown, the elements 13 and 14 are eccentric pipe elements, but concentric elements may be employed. The smaller end of the element 14 is joined to the upstream body end portion 12a of the flange 12, the interior surface of the body portion 12a being tapered to reduce the internal diameter to approximately that of the conduit section 2. Between the opposed ends of the elements 13 and 14 is disposed a T section 15 of the same diameter as the inner ends of sections 13 and 14 with the branch of the T extending vertically upward and provided with a flange portion 15a having a cover member 15b. A pressure gauge 16 and a vent 17 are provided in the cover communicating therethrough with the interior of the T branch.

As shown in Fig. 1 the conduit end sections 1 and 2 are also connected by means of a by-pass line 5 having an inlet on the upstream side of valve 3 as at 5a and an outlet on the downstream side of valve 4 as at 5b. A valve 6 is interposed in the line 5 adjacent the inlet 5a. A secondary by-pass line 7 is provided with an inlet from the trap 10 as at 7a and an outlet into the line 5 as at 7b on the downstream side of the valve 6 as between valve 6 and outlet 5b. A valve 8 is interposed in the line 7 between the inlet and outlet thereof. As illustrated in Fig. 1 the inlet and outlet of the primary by-pass line 5 is provided by means of T sections adjacent the flanges 1a and 2a respectively in the conduit sections 1 and 2. Similarly the outlet of the line 7 opening into line 5 is provided by a T section in the latter line.

It is preferred that the inlet and outlet junction points between the line 5 and conduit and sections 1 and 2 be provided with a guide and guard rod 9. The rod 9 may be disposed diametrically across the opening of both the inlet and the outlet either horizontally or vertically. It is essential, however, that in either position the rod conform substantially to the radial curvature of the conduit sections and offer no obstruction in the substantially smoothly curved interior surface of the conduit portions.

In the assembly as shown it is contemplated that the by-pass line will be approximately one-half the diameter of the main conduit line. For example, with an 8" conduit the by-pass lines 5 and 7 might be about 4" in diameter. The sizes of these lines would depend on flow conditions. In a short line with a high flow and pressure drop it might be desirable to have a by-pass equal in diameter to the main line.

In normal operation all valves shown would be opened thus permitting flow not only through the main conduit line but also through the by-pass lines whereby stagnation of the fluid carried in any portion of the assembly is avoided. Upon the approach of a scraper element to a location of an assembly as shown, if desired to remove the element from the line, the valve 4 would be closed, valves 3, 6 and 8 remaining open. Due to the flow of fluid through the line 7 and valve 8, the pipeline scraper element would be carried into the trap 10 where movement would be stopped by the back pressure created by the closed valve 4. As soon as the element comes to rest in the trap 10, valves 3 and 8 are closed in succession. The scraper element is then held in the trap with the fluid contents thereof at approximately the normal line pressure. This pressure is then relieved by means of the vent 17 until the pressure shown by the gauge 16 is approximately atmospheric. Cover 15b is then removed and the scraper element may be lifted out of the trap through the opening in the T section with a minimum of spillage.

With the scraper element removed the cover 15b may be replaced and all valves reopened to re-establish normal flow through the assembly, or if another scraper is to be introduced it is inserted into the trap and cover replaced after such insertion. With the new scraper element in the trap and manually started in a down-stream direction the valves 3 and 4 are opened in succession. If the scraper does not immediately leave the trap passing through the valve 4, the valve 6 is closed to increase pressure through the valve 3 and trap 10. Inasmuch as the scraper element is usually of a type which provides a movable plug in the line the flow of fluid therethrough under line pressure is sufficient to force the scraper onward through valve 4 into the line section 2 and thus onward through the conduit. When the scraper element has been thus introduced and started through the conduit, the valve 6, if previously closed, and valve 8 are opened to again utilize the flushing action of fluid flow through all portions of the trap assembly. The guide and guard rod elements 9 in the inlet and outlet portions 5a and 5b respectively of the primary by-pass line 5 guard against any tendency for a pipeline scraper element to enter the line 5 and guide the scraper element in its forward movement through the conduit in passing the inlet and outlet portions 5a and 5b.

The embodiment of the invention as described in the foregoing specification and shown in the accompanying drawings is for the purpose only of illustration and it is not intended that the invention be in any way limited thereby but only by the appended claim.

What is claimed is:

A pipe-line scraper, conduit-trap assembly, comprising in combination with a conduit having spaced, opposed upstream and downstream end portions, a valve affixed to each conduit end portion, said valves when open providing passageways substantially equal to the diameter of said conduit, an enlarged trap member secured in the line between said valves, a primary by-pass line having an inlet from said conduit on the upstream side of one of said valves, and an outlet into the conduit on the downstream side of the other valve, a valve in said line adjacent the upstream inlet, a secondary by-pass line having an inlet from said trap, and an outlet into said primary by-pass line on the downstream side of the valve in said line, a valve in said secondary by-pass line, and means for venting pressure from said trap.

BURTON VER NOOY.

REFERENCES CITED

The following references are of record in the file of this patent:

UNITED STATES PATENTS

| Number | Name | Date |
|---|---|---|
| 973,794 | Lightcap | Oct. 25, 1910 |
| 2,493,504 | Roberts | Jan. 3, 1950 |

FOREIGN PATENTS

| Number | Country | Date |
|---|---|---|
| 6,759 | Netherlands | May 15, 1922 |